(12) United States Patent
Richardson et al.

(10) Patent No.: US 10,601,738 B2
(45) Date of Patent: Mar. 24, 2020

(54) TECHNOLOGIES FOR BUFFERING RECEIVED NETWORK PACKET DATA

(71) Applicant: Intel Corporation, Santa Clara, CA (US)

(72) Inventors: Bruce Richardson, Shannon (IE); Chris MacNamara, Limerick (IE); Patrick Fleming, Slatt Wolfhill (IE); Tomasz Kantecki, Ennis (IE); Ciara Loftus, Galway (IE); John J. Browne, Limerick (IE); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,774

(22) Filed: Jun. 30, 2018

(65) Prior Publication Data

US 2019/0044893 A1 Feb. 7, 2019

(51) Int. Cl.
*H04L 12/861* (2013.01)
*H04L 12/879* (2013.01)

(52) U.S. Cl.
CPC ........ *H04L 49/9052* (2013.01); *H04L 49/901* (2013.01); *H04L 49/9026* (2013.01); *H04L 49/9068* (2013.01)

(58) Field of Classification Search
CPC .... H04W 80/04; H04W 8/26; H04Q 11/0428; H04Q 11/0471; H04Q 11/0407; H04Q 2213/13003; H04L 49/254; H04L 29/0653; H04L 29/06095; H04L 49/3009; H04L 49/309; H04L 45/74; H04L 2012/5681; H04L 49/90; H04L 49/901; H04L 49/9094; H04L 49/30; H04L 1/0007; H04L 47/36

USPC ....... 370/349, 359, 360, 392, 395.7, 395.71, 370/401, 402, 419, 470, 474, 471, 363
See application file for complete search history.

(56) References Cited

U.S. PATENT DOCUMENTS 6,434,620 B1 8/2002 Boucher et al.
6,453,360 B1 * 9/2002 Muller .................... H04L 29/06
370/235
6,480,489 B1 11/2002 Muller et al.
7,307,998 B1 12/2007 Wang et al.
(Continued)

OTHER PUBLICATIONS

Extended European search report for European patent application No. 19177463.7, dated Sep. 25, 2019 (10 pages).

*Primary Examiner* — Brenda H Pham
(74) *Attorney, Agent, or Firm* — Barnes & Thornburg LLP (57) ABSTRACT

Technologies for buffering received network packet data include a compute device with a network interface controller (NIC) configured to determine a packet size of a network packet received by the NIC and identify a preferred buffer size between a small buffer and a large buffer. The NIC is further configured to select, from the descriptor, a buffer pointer based on the preferred buffer size, wherein the buffer pointer comprises one of a small buffer pointer corresponding to a first physical address in memory allocated to the small buffer or a large buffer pointer corresponding to a second physical address in memory allocated to the large buffer. Additionally, the NIC is configured to store at least a portion of the network packet in the memory based on the selected buffer pointer. Other embodiments are described herein.

25 Claims, 5 Drawing Sheets

(56) References Cited

U.S. PATENT DOCUMENTS 8,032,670 B2 * 10/2011 Go .......................... G06F 13/28
710/1
2007/0002880 A1   1/2007 Chien et al.
2009/0304016 A1  12/2009 Rohde et al.

* cited by examiner

TECHNOLOGIES FOR BUFFERING RECEIVED NETWORK PACKET DATA

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs some level of examination on at least a portion of the received network packet to determine what, if any, operations (e.g., drop the network packet, process/store at least a portion of the network packet, forward the network packet, etc.) are to be performed by the computing device. Accordingly, it should be appreciated that data associated with the network packet (e.g., header data, payload data, footer data, etc.) is buffered upon receipt. To do so, present techniques typically allocate large buffers to accommodate entire jumbo frames or use a collection of smaller buffers chained together. However, in such embodiments in which large buffers are used, small network packets can consume a large buffer, resulting in wasted memory. Alternatively, in such embodiments in which a chain of small buffers is used, the chain of small buffers has to be processed by the receive stack and the resulting discontiguous packet means that prefetch operation(s) may not operate effectively, each of which can lower overall system performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
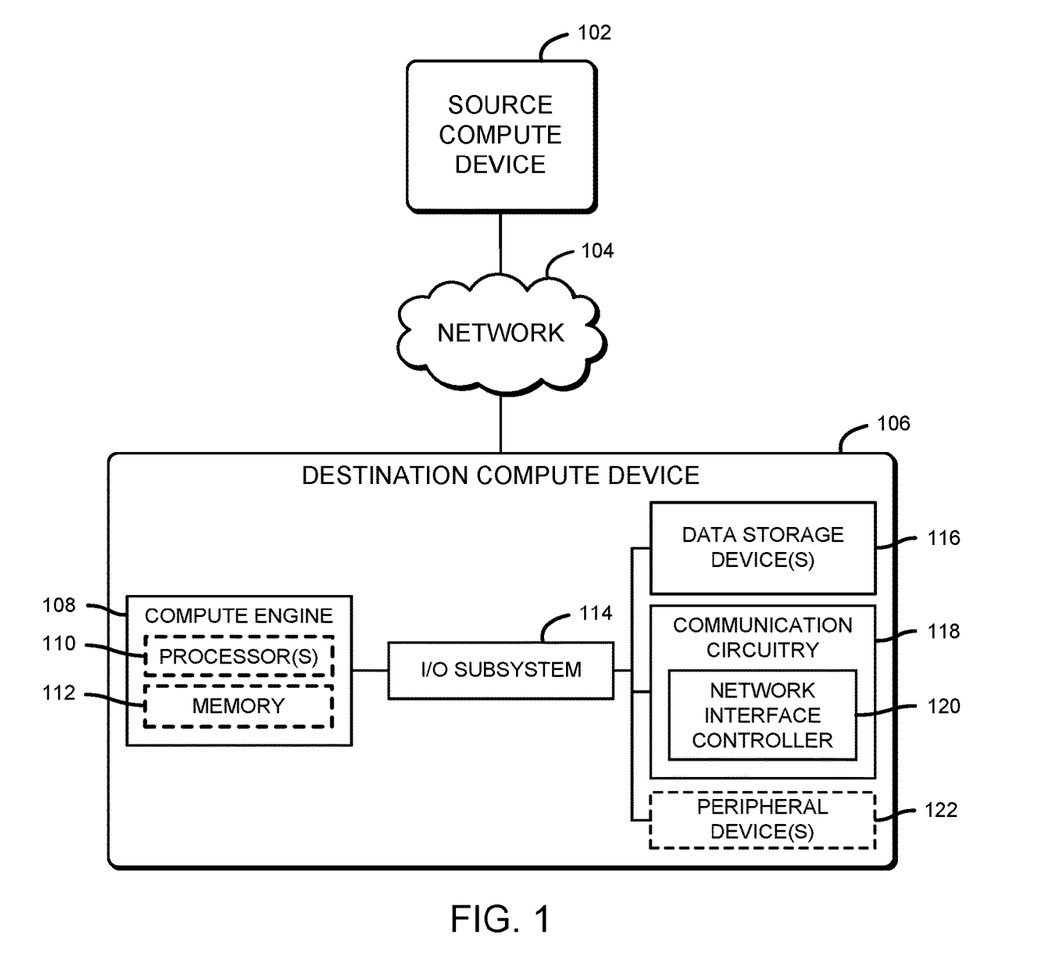
FIG. 1 is a simplified block diagram of at least one embodiment of a system for buffering received network packet data that includes a source compute device and a destination compute device communicatively coupled via a network.

Referring now to FIG. 1, in an illustrative embodiment, a system 100 for buffering received network packet data includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more interconnects.

In use, the source compute device 102 and the destination compute device 106 transmit and receive network traffic (e.g., network packets, frames, etc.) to/from each other, as well as other compute devices in the network 104, as applicable. For example, the destination compute device 106 may receive a network packet from the source compute device 102. Upon receipt of a network packet, the destination compute device 106, or more particularly a network interface controller (NIC) 120 of the destination compute device 106, stores at least a portion of the data associated with the received network packet into a previously allocated data buffer (e.g., via a direct memory access (DMA) operation).

To do so, as will be described in further detail below, the NIC 120 configures a descriptor for each received network packet. It should be appreciated that each descriptor includes information describing a network packet, as well as packet processing/offload information, as applicable. Each descriptor includes information usable to identify a physical address in host memory where the network packet data has been stored (e.g., a pointer to a data buffer). However, unlike present technologies, the NIC 120, as described herein, is configured to include a buffer pointer to a small buffer (i.e., a small buffer pointer) from a pool of previously allocated small buffers and another buffer pointer to a large buffer (i.e., a large buffer pointer) from a pool of previously allocated large buffers. Accordingly, it should be appreciated that, during an initialization period (e.g., initialization of a receive queue), the NIC 120 has previously allocated each pool of large (e.g., 10K-byte buffers) and small buffers (e.g., 2K-byte buffers), and maintained a list of pointers referencing the location in memory of each buffer.

As such, when a network packet has been received, the NIC 120 can determine the size of the received network packet and select between the large and small buffer in which to store the network packet data into (i.e., using the respective buffer pointer included in the descriptor) based on the determined size of the received network packet. Each descriptor is configured to include a pointer to a small buffer from the small buffer pool and a pointer to a large buffer from the large buffer pool. Accordingly, to store the network packet data (e.g., the header and payload, the payload, at least a portion of the payload, etc.), the NIC 120 is configured to select (i.e., retrieve or otherwise identify) the applicable buffer pointer from the descriptor which corresponds to the selected buffer. To indicate in which buffer the network packet data has been stored, the NIC 120 is configured to provide such indication in the descriptor as well. For example, the descriptor may be updated to include a buffer length usable to identify which buffer was used (see, e.g., the receive descriptor 500 of FIG. 5), an identifier corresponding to which buffer was used (see, e.g., the receive descriptor 600 of FIG. 6), or some other identifying field in the descriptor.

While the buffer pools are illustratively described herein as being a pool of large buffers and a pool of small buffers from which to select from, it should be appreciated that, in other embodiments, additional buffer pools may be allocated and selected according to the decision-making logic described herein. For example, in an alternative embodiment, the NIC 120 may be previously allocated a pool of small buffers, a pool of medium buffers, and a pool of large buffers. It should be appreciated that an allocated portion of memory for each of the small buffers is smaller than an allocated portion of memory for each of the medium buffers, and that an allocated portion of memory for each of the large buffers is greater than the allocated portion of memory for each of the medium buffers. In furtherance of the example, the associated descriptor includes a buffer pointer to each of the buffers. In an illustrative example, the large buffers may be 10K-byte buffers, the medium buffers may be 5K-byte buffers, and the small buffers may be 2K-byte buffers. In furtherance of the illustrative example, each descriptor will include a pointer to a small buffer from the small buffer pool, a pointer to a medium buffer from the medium buffer pool, and a pointer to a large buffer from the large buffer pool.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments), may be embodied as any type of firmware, hardware, software, or any combination thereof that facilities communications access between the destination compute device 106 and a network (e.g., the network 104). For example, the NIC 120 may be embodied as one or more add-in-boards, daughtercards, network interface cards, controller chips, chipsets, or other devices that may be used by the destination compute device 106 to connect with another compute device (e.g., the source compute device 102). In some embodiments, the NIC 120 may be embodied as part of a SoC that includes one or more processors, or included on a multichip package that also contains one or more processors. In some embodiments, the NIC 120 may include a local processor (not shown) and/or a local memory (not shown) that are both local to the NIC 120. In such embodiments, the local processor of the NIC 120 may be capable of performing one or more of the functions of a processor 110 described herein. Additionally or alternatively, in such embodiments, the local memory of the NIC 120 may be integrated into one or more components of the destination compute device 106 at the board level, socket level, chip level, and/or other levels.

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
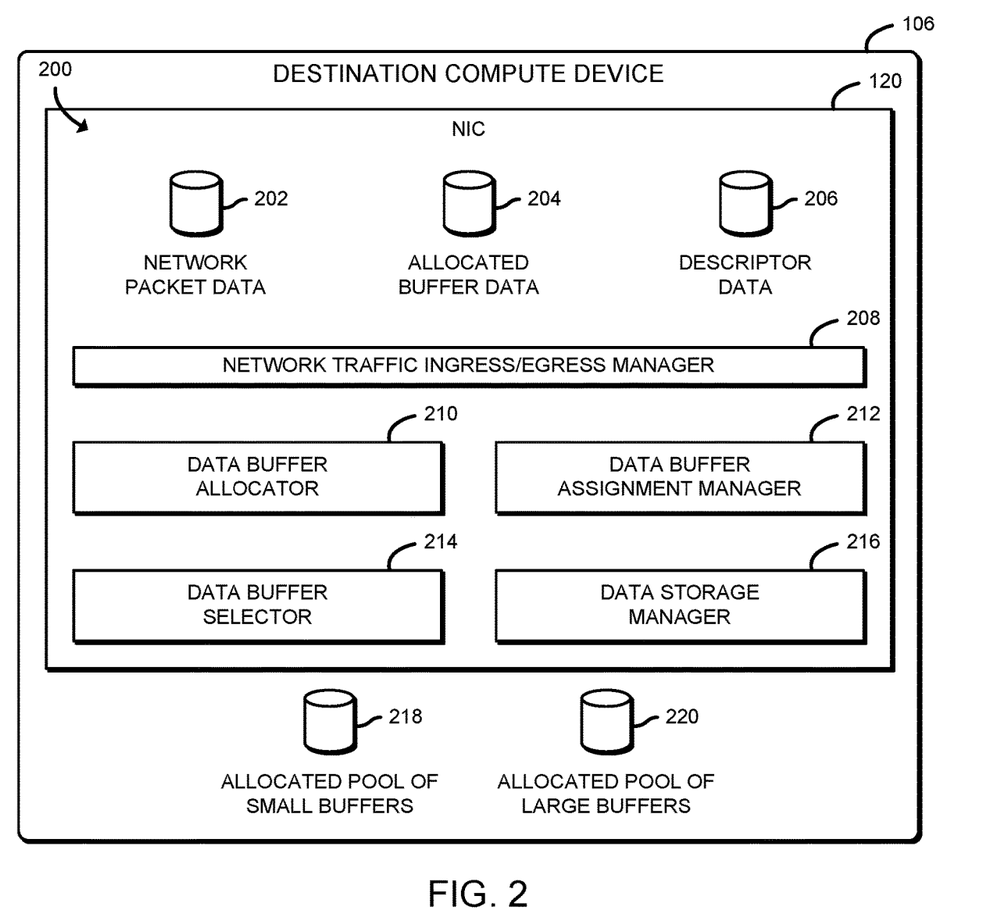
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208, a data buffer allocator 210, a data buffer assignment manager 212, a data buffer selector 214, and a data storage manager 216. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, data buffer allocation circuitry 210, data buffer assignment management circuitry 212, data buffer selection circuitry 214, data storage management circuitry 216, etc.).

As illustratively shown, the network traffic ingress/egress management circuitry 208, the data buffer allocation circuitry 210, the data buffer assignment management circuitry 212, the data buffer selection circuitry 214, and the data storage management circuitry 216 form a portion of the NIC 120. However, it should be appreciated that, in other embodiments, one or more functions described herein as being performed by the network traffic ingress/egress management circuitry 208, the data buffer allocation circuitry 210, the data buffer assignment management circuitry 212, the data buffer selection circuitry 214, and/or the data storage management circuitry 216 may be performed, at least in part, by one or more other components of the destination compute device 106, such as the compute engine 108, the I/O subsystem 114, the communication circuitry 118, and/or other components of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, or other software/hardware components of the destination compute device 106. It should be appreciated that the destination compute device 106 may include other components, sub-components, modules, sub-modules, logic, sub-logic, and/or devices commonly found in a computing device (e.g., device drivers, interfaces, etc.), which are not illustrated in FIG. 2 for clarity of the description.

In the illustrative environment 200, the destination compute device 106 additionally includes network packet data 202, allocated buffer data 204, and descriptor data 206, each of which may be accessed by the various components and/or sub-components of the destination compute device 106. Further, each of the network packet data 202, the allocated buffer data 204, and the descriptor data 206 may be accessed by the various components of the destination compute device 106. Additionally, it should be appreciated that in some embodiments the data stored in, or otherwise represented by, each of the network packet data 202, the allocated buffer data 204, and the descriptor data 206 may not be mutually exclusive relative to each other. For example, in some implementations, data stored in the network packet data 202 may also be stored as a portion of one or more of the allocated buffer data 204 and/or the descriptor data 206, or in another alternative arrangement. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith.

Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well as the egress buffers/queues associated therewith. In some embodiments, at least a portion of the network packet (e.g., at least a portion of a header of the network packet, at least a portion of a payload of the network packet, at least a portion of a footer of the network packet, etc.) may be stored in the network packet data 202. Additionally or alternatively, in some embodiments, information about the network packet (e.g., a flow/workload type of the network packet, a source of the network packet, a destination of the network packet, a protocol associated with the network packet, etc.) may be stored in the network packet data 202.

The data buffer allocator 210, which may be embodied as hardware, firmware, software, virtualized hardware, emulated architecture, and/or a combination thereof as discussed above, is configured to manage the allocation of data buffers in which at least a portion of received network packet data is to be temporarily stored. The data buffer allocator 210 is configured to allocate two pools of multiple data buffers, each buffer pool having different sizes. To do so, the data buffer allocator 210 is configured to allocate the first pool of data buffers having a smaller size relative to the second pool of allocated data buffers. In other words, the data buffer allocator 210 is configured to allocate a pool of small buffers to hold smaller sized packets and a pool of large buffers having a buffer size large enough to hold larger sized packets (e.g., a jumbo frame).

In some embodiments, the size of the small buffers may be based on a standard maximum transmission unit (MTU) (e.g., 1500K-bytes), while the size the large buffers may be based on a supported size of a jumbo frame (e.g., a size greater than 1500K-bytes). In an illustrative embodiment, the data buffer allocator 210 may be configured allocate each of the data buffers of the small buffer pool to be 2K-byte in size and each of the data buffers of the large buffer pool to be 10K-byte in size. However, it should be appreciated that different sized data buffers may be used in other embodiments. In some embodiments, data associated with the allocated buffers (e.g., allocated buffer size, pool association, pointers to the location in memory for each buffer, etc.) may be stored in the allocated buffer data 204.

The illustrative destination compute device 106 of FIG. 2 additionally includes an allocated pool of small buffers 218 and an allocated pool of large buffers 220, which may be stored, at least in part, in a location in memory of the destination compute device 106, such as the memory 112 (e.g., accessible via a processor core of a processor 110) and/or the data storage device(s) 116 of the illustrative destination compute engine 106 of FIG. 1. Accordingly, it should be appreciated that the data associated with the allocated buffers corresponds to the addresses, size, etc., of the allocated buffers. While illustratively shown as only having a pool of small buffers 218 and a pool of large buffers 220, it should be appreciated that, as noted previously, alternative embodiments may include additional buffer pools, for which the data buffer allocator 210 is further configured to allocate each pool of respective buffers, each having different allocated sizes.

In some embodiments, the data buffer allocator 210 may be configured to dynamically adjust the allocated size of the pool of small buffers and/or the pool of large buffers. To do so, the data buffer allocator 210 may be configured to analyze the size of received network packets over a period of time and adjust the size of the buffer pools based on a result of the analysis. For example, if the data buffer allocator 210 determines that the destination compute device 106 has or is likely to receive (e.g., based on historically analyzed data and/or trends based on workload/flow types presently being received) significantly more smaller sized network packets than larger sized network packets, the data buffer allocator 210 may be configured to allocate more small buffers than large buffers.

Similarly, the data buffer allocator 210 may be configured to dynamically adjust the size of the data buffers over time. For example, if the data buffer allocator 210 has been configured to allocate 10K-byte data buffers, but the data buffer allocator 210 has determined that the destination compute device 106 has or is likely to receive (e.g., based on historically analyzed data and/or trends based on workload/flow types presently being received) significantly smaller sized jumbo network packets, the data buffer allocator 210 may be configured to reduce the size of memory allocated to the large data buffers (e.g., reduce to 9K-byte or less, while still remaining greater than the size of memory allocated to the small data buffers). In other words, the data buffer allocator 210 may be configured to allocate the large data buffers based on a maximum expected size of a jumbo frame.

The data buffer assignment manager 212 which may be embodied as hardware, firmware, software, virtualized hardware, emulated architecture, and/or a combination thereof as discussed above, is configured to assign previously allocated data buffers (e.g., allocated by the data buffer allocator 210) to each descriptor of a network packet. To do so, the data buffer assignment manager 212 is configured to select or otherwise identify a free small buffer from the small buffer pool and a large buffer from the large buffer pool. In some embodiments, the data buffer assignment manager 212 may be configured to manage a queue of free small buffers and another queue of free large buffers from which to make the selection. In such embodiments, the status and/or queue information may be stored in the allocated buffer data.

The data buffer assignment manager 212 is further configured to insert a pointer associated with the selected free small buffer into a designated field in the descriptor and insert a pointer associated with the selected free large buffer into another designated field in the descriptor. In some embodiments, the data buffer assignment manager 212 may be configured to update additional fields in the descriptor associated with the selected buffers. For example, the descriptor may include one or more fields usable to identify which data buffer was used to store at least a portion of the data of a received network packet for which the descriptor corresponds.

Figure 5:
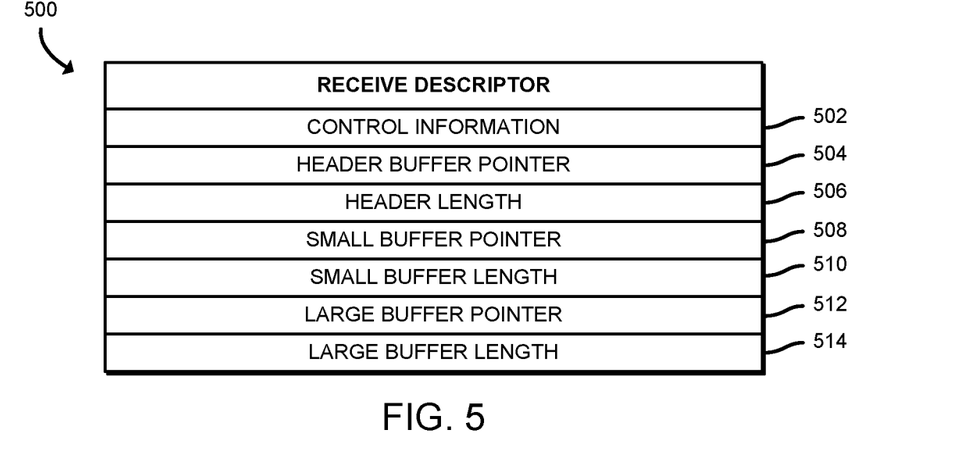
FIG. 5 illustratively shows at least one embodiment of a descriptor that includes different sized buffer fields for buffering received network packet data.

In an illustrative example, the descriptor may include a small buffer length field to be associated with the small buffer and a large buffer length field to be associated with the large buffer (see, e.g., the descriptor 500 of FIG. 5). In such embodiments, the data buffer assignment manager 212 may be configured to initialize the small buffer length field and the large buffer length field to a value of zero. Accordingly, upon use of one of the data buffers (i.e., to store at least a portion of the data of a received network packet for which the descriptor corresponds), the applicable buffer length field associated with the data buffer used may be updated (e.g., by the data storage manager 216).

As such, subsequent inspection of the buffer length fields in the descriptor (e.g., by a receiving application, device driver, NIC interface, etc.) can be used to identify which of the data buffers was used. It should be appreciated that alternative indicators may be used in alternative embodiments, such as a used buffer identification field or some other used buffer identifying field in the descriptor. In some embodiments, the descriptor information (i.e., descriptor fields) may be stored in the descriptor data 206. Additionally, in some embodiments, the descriptors may be stored in one or more descriptor ring data structures (i.e., circular buffer queues) and the information associated therewith (e.g., head/tail information, starting location of the receive descriptor ring, a length of the descriptor ring, etc.) may be stored in the descriptor data 206.

The data buffer selector 214, which may be embodied as hardware, firmware, software, virtualized hardware, emulated architecture, and/or a combination thereof as discussed above, is configured to select which data buffer in which to store the at least a portion of the data of a received network packet. To do so, the data buffer selector 214 is configured to determine a size of the received network packet associated with the descriptor. It should be appreciated that, in some embodiments, packet headers may be written into their own buffer separate from the data buffer in which the payload of the received network packet is to be stored. Accordingly, in such embodiments, it should be further appreciated that the size of the received network packet associated with the descriptor is based on the size of the received network packet minus the header length/size, rather than the total size of the received network packet (i.e., header and payload).

The data buffer selector 214 is additionally configured to identify the preferred data buffer size (e.g., large or small) based on the determined size of the received network packet. In an illustrative example in which the small data buffer is 2K-byte, the large data buffer is 10K-byte, and a received network packet has a size of 1,500 bytes (e.g., a size equivalent to the standard maximum transmission unit (MTU)), the data buffer selector 214 would be configured to select the small data buffer. In furtherance of the illustrative example in which the received network packet has a size of 9,000 bytes, the data buffer selector 214 would be configured to select the large data buffer.

The data storage manager 216, which may be embodied as hardware, firmware, software, virtualized hardware, emulated architecture, and/or a combination thereof as discussed above, is configured to manage the storage of the network packet data into the applicable data buffer. To do so, the data storage manager 216 is configured to select/retrieve, from the descriptor, a pointer to a location in memory corresponding to the selected data buffer. In some embodiments, the retrieval/selection of the pointer to the applicable data buffer may be performed by the data buffer selector 214, as described previously, in response to a request initiated by the data storage manager 216. The data storage manager 216 is further configured to store the network packet data into the data buffer using the retrieved pointer (e.g., via a DMA operation).

Additionally, the data storage manager 216 is configured to indicate in which data buffer the network packet data has been stored. To do so, the data storage manager 216 is configured to update at least one field in the descriptor to reflect the used data buffer. As described previously in an illustrative example, the descriptor may include a small buffer length field and a large buffer length field length, each reflecting an amount of the respective buffer used (e.g., in bytes). In such embodiments, the data storage manager 216 is configured to set the buffer length field corresponding to the used data buffer to a size of the network packet (e.g., an amount of the buffer that has been used to store the network packet data). In furtherance of the illustrative example in which the small buffer was used to store the network packet data, the data storage manager 216 is configured to update the small buffer length field such that subsequent inspection of the buffer length fields (e.g., by a receiving application, device driver, NIC interface, etc.) will indicate that the small buffer was used.

As also described previously, alternative indicators may be used in alternative embodiments, such as a used buffer identification field or some other used buffer identifying field in the descriptor. Accordingly, it should be appreciated that, in such alternative embodiments, the data storage manager 216 is configured to update the applicable field(s) of the descriptor as necessary to indicate in which data buffer the network packet data has been stored. As such, the unused data buffer may be reclaimed before the network packet is indicated to the host (e.g., a host/guest operating system/application of the destination compute device 106). In other words, ownership of the unused data buffers remains with the data buffer assignment manager 212, which allows the data buffer assignment manager 212 to immediately requeue the unused data buffer for use by a subsequently received network packet or placed in a free pool to be used later without the cycles required for an allocation of another data buffer.

Figure 3:
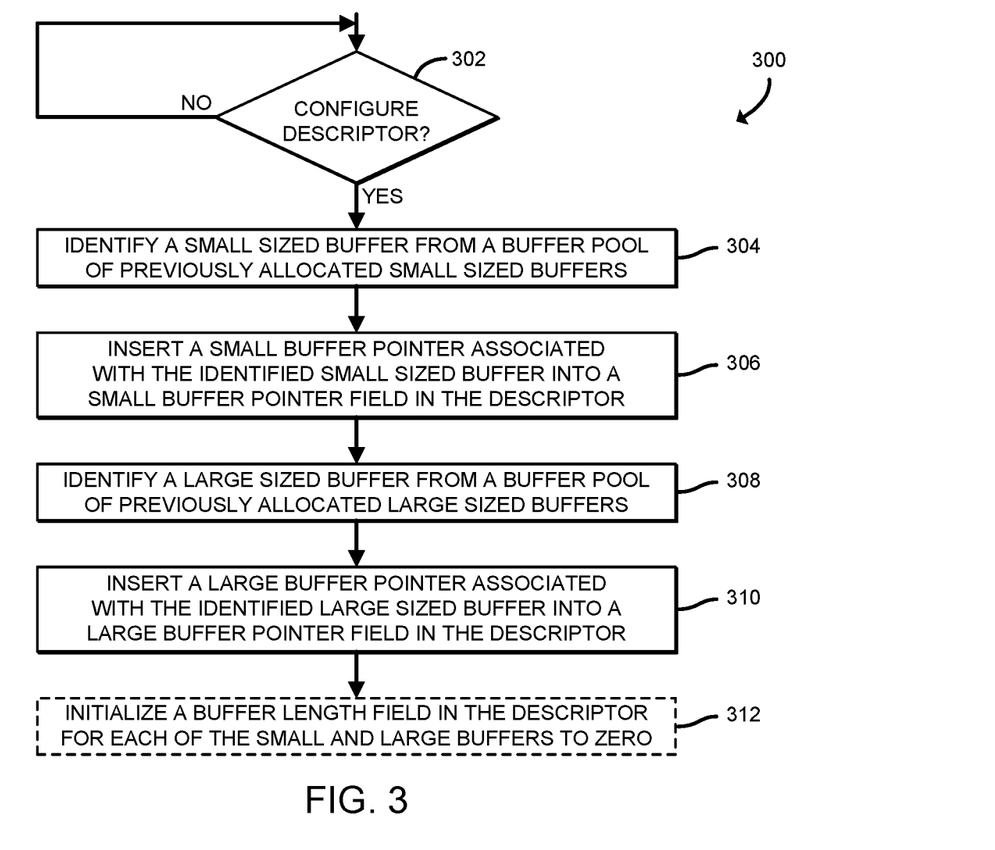
FIG. 3 is a simplified flow diagram of at least one embodiment of a method for associating a descriptor with different sized data buffers for buffering data of a received network packet that may be executed by the destination compute device of FIGS. 1 and 2.

Referring now to FIG. 3, a method 300 for associating a descriptor with different sized data buffers for buffering data of a received network packet is shown which may be executed by a compute device (e.g., the destination compute device 106 of FIGS. 1 and 2), or more particularly by a NIC of the compute device (e.g., the NIC 120 of FIG. 2) or a device driver associated therewith. The method 300 begins with block 302, in which the NIC 120 determines whether a descriptor is to be configured. It should be appreciated that, prior to the method 300 being executed (i.e., before a descriptor is configured), the NIC 120 has previously allocated a pool of multiple small sized buffers and a pool of multiple large sized buffers, as described herein.

If the NIC 120 determines that a descriptor is to be configured, the method advances to block 304, in which the NIC 120 identifies a small sized buffer from a buffer pool of previously allocated small sized buffers. In block 306, the NIC 120 inserts a small buffer pointer associated with the identified small sized buffer into a small buffer pointer field in the descriptor. In block 308, the NIC 120 identifies a large sized buffer from a buffer pool of previously allocated large sized buffers. In block 310, the NIC 120 inserts a large buffer pointer associated with the identified large sized buffer into a large buffer pointer field in the descriptor. As described previously, the NIC 120 is configured to indicate which buffer has been used to store at least a portion of a received network packet. As also described previously, in one such illustrative embodiment, the descriptor includes buffer length fields (i.e., a small buffer length field and a large buffer length field) usable to indicate which buffer has been used. Accordingly, in such embodiments, in block 312, the NIC 120 may be additionally configured to initialize each of the small buffer length field and the large buffer length field to a value of zero.

Figure 4:
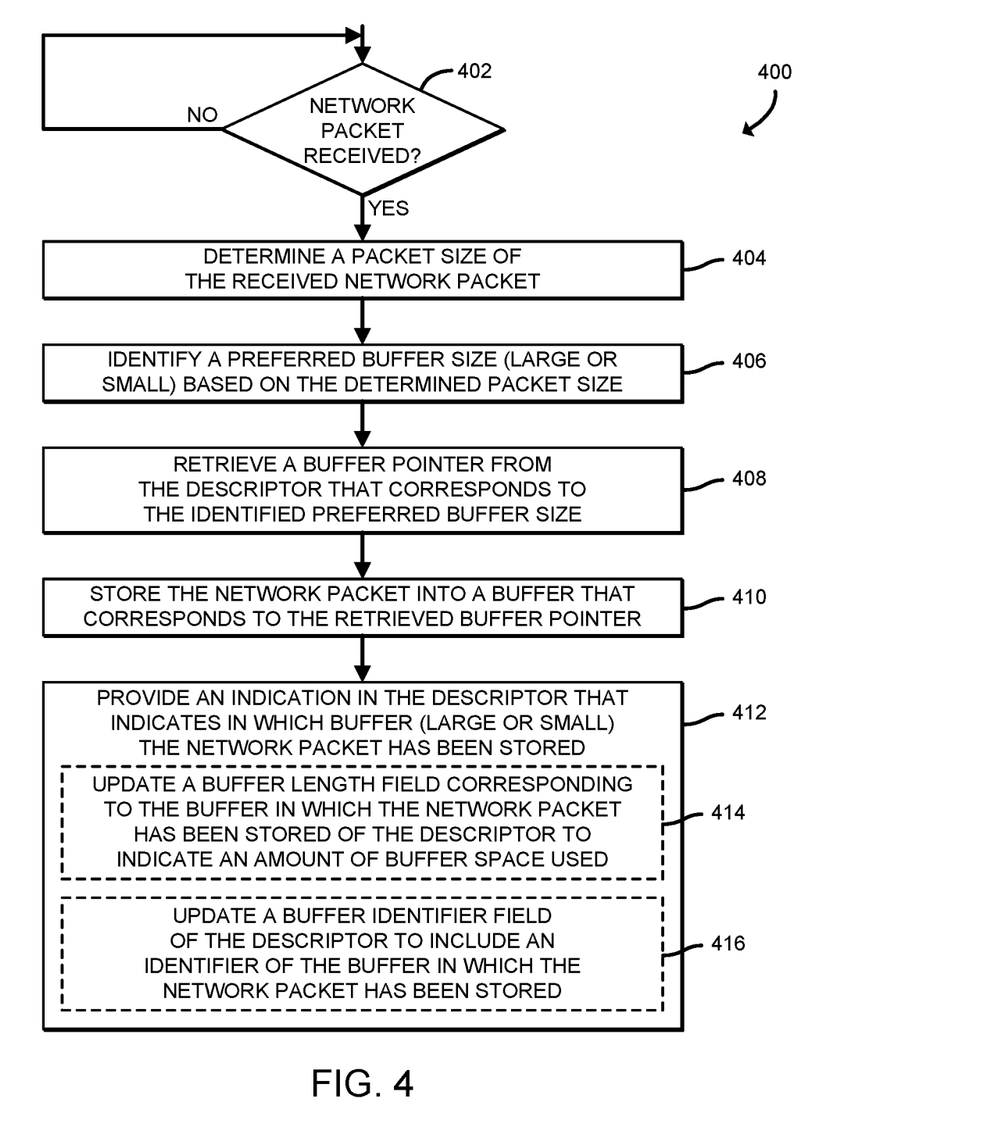
FIG. 4 is a simplified flow diagram of at least one embodiment of a method for buffering received network packet data that may be executed by the destination compute device of FIGS. 1 and 2.

Referring now to FIG. 4, a method 400 for buffering received network packet data is shown which may be executed by a compute device (e.g., the destination compute device 106 of FIGS. 1 and 2), or more particularly by a NIC of the compute device (e.g., the NIC 120 of FIG. 2) or a device driver associated therewith. It should be appreciated that a descriptor has been configured upon receipt of the network packet, which is not described herein beyond the configuration described above with respect to the method 300 of FIG. 3. The method 400 begins with block 402, in which the NIC 120 determines whether a network packet has been received. If so, the method 400 advances to block 404, in which the NIC 120 determines a packet size of the received network packet. As described previously, in some embodiments, the header of the received network packet may be written into its own data buffer. Accordingly, in such embodiments, the determination of the packet size may be based on the remaining size of the packet (i.e., the total packet length minus header size) rather than the total size of the received network packet (i.e., the header and payload). In block 406, the NIC 120 identifies a preferred buffer size (i.e., between the large and small buffer sizes) based on the determined packet size.

In block 408, the NIC 120 selects (i.e., retrieves or otherwise identifies) a buffer pointer from the descriptor associated with the received network packet that corresponds to the identified preferred buffer size. In block 410, the NIC 120 stores the network packet into a buffer that corresponds to the selected buffer pointer. In block 412, the NIC 120 provides an indication in the descriptor that indicates which of the small buffer or the large buffer has been used to store the network packet data. For example, in block 414, the NIC 120 may update a buffer length field of the descriptor that corresponds to the data buffer in which the network packet data has been stored to indicate an amount of buffer space used (i.e., a length of the network packet data stored in the data buffer). In another example, in block 416, the NIC 120 may update a buffer identifier field of the descriptor to include an identifier of the buffer (i.e., an identifier of the small or large data buffer) in which the network packet data has been stored.

Referring now to FIG. 5, an illustrative receive descriptor 500 is shown that includes a control information field 502, a header buffer pointer field 504, a header length field 506, a small buffer pointer field 508, a small buffer length field 510, a large buffer pointer field 512, and a large buffer length field 514. The control information field 502 may include any information usable to identify what operation(s) (e.g., pre-processing and/or offloaded operation(s)) are to be performed on at least a portion of the network packet data. The header buffer pointer field 504 provides a pointer usable to identify a header buffer at a physical address in host memory where a header of the network packet has been stored. The header length field 506 indicates a length (e.g., in bytes) of the header of the network packet stored in the header buffer.

The small buffer pointer field 508 provides a pointer usable to identify a previously allocated small sized data buffer of a pool of previously allocated small sized data buffers. The small buffer length field 510 indicates a length (e.g., in bytes) of the data of the network packet stored in the small buffer. The large buffer pointer field 512 provides a pointer usable to identify a previously allocated large sized data buffer of a pool of previously allocated large sized data buffers. The large buffer length field 514 indicates a length (e.g., in bytes) of the data of the network packet stored in the large buffer. Accordingly, it should be appreciated that, in the illustrative embodiment, the network packet header is split into a different memory space than the payload.

Figure 6:
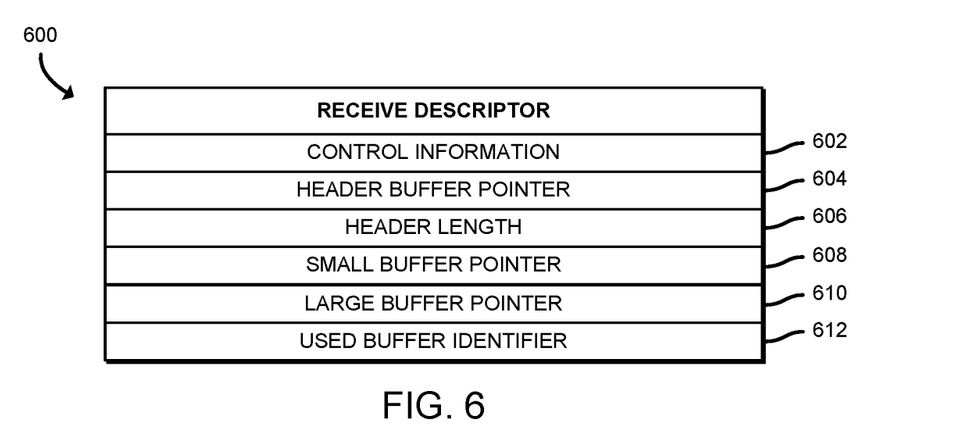
FIG. 6 illustratively shows at least another embodiment of a descriptor that includes different sized buffer fields for buffering received network packet data.

Referring now to FIG. 6, another illustrative receive descriptor 600 is shown that includes a control information field 602, a header buffer pointer field 604, a header length field 606, a small buffer pointer field 608, a large buffer pointer field 610, and a used buffer identifier field 612. The control information field 602, the header buffer pointer field 604, the header length field 606, the small buffer pointer field 608, and the large buffer pointer field 610 are substantially similar to the similarly named fields in the illustrative receive descriptor 500 of FIG. 5. As such, the descriptions thereof are not repeated herein for clarity of the description with the understanding that the description of the receive descriptor fields provided above in regard to the illustrative receive descriptor 500 applies equally to the corresponding receive descriptor fields of the illustrative receive descriptor 600. The used buffer identifier field 612 provides an identifier of the used buffer. In other words, the used buffer identifier field 612 provides an identifier of the small buffer or the large buffer.

It should be appreciated that, while not illustratively shown, the descriptor may contain additional and/or alternative fields, depending on the embodiment, such as a virtual LAN (VLAN) tag, error indicator(s), status indicator(s) (e.g., whether the descriptor has been used, whether the referenced buffer is the last one for the packet, etc.), type indicator(s) (e.g., flow type, workload type, etc.), etc.

EXAMPLES

Illustrative examples of the technologies disclosed herein are provided below. An embodiment of the technologies may include any one or more, and any combination of, the examples described below.

Example 1 includes a compute device for buffering received network packet data, the compute device comprising a compute engine; a memory; and a network interface controller (NIC) to determine a packet size of a network packet received by the NIC; identify, from a descriptor associated with the network packet and based on the determined packet size of the network packet, a preferred buffer size between (a) a small buffer having a small amount of the memory allocated thereto and (b) a large buffer having a larger amount of the memory, relative to the small buffer, allocated thereto; select, from the descriptor, a buffer pointer based on the preferred buffer size, wherein the buffer pointer comprises one of (a) a small buffer pointer to the small buffer or (b) a large buffer pointer to the large buffer, wherein the small buffer pointer corresponds to a first physical address in the memory corresponding to the small buffer, and wherein the large buffer pointer corresponds to a second physical address in the memory corresponding to the large buffer; and store at least a portion of the network packet in the memory based on the selected buffer pointer.

Example 2 includes the subject matter of Example 1, and wherein the NIC is further to allocate a pool of a plurality of small buffers and a pool of a plurality of large buffers; and configure the descriptor to include the small buffer pointer corresponding to the small buffer from the pool of small buffers and the large buffer pointer corresponding to the large buffer from the pool of large buffers.

Example 3 includes the subject matter of any of Examples 1 and 2, and wherein the NIC is further to provide, in the descriptor, an indication usable to identify whether the at least a portion of the network packet was stored in the small buffer or the large buffer.

Example 4 includes the subject matter of any of Examples 1-3, and wherein to provide the indication usable to identify whether the at least a portion of the network packet was stored in the small buffer or the large buffer comprises to update a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

Example 5 includes the subject matter of any of Examples 1-4, and wherein to provide the indication usable to identify whether the at least a portion of the network packet was stored in the small buffer or the large buffer comprises to update a used buffer identifier value in the descriptor, wherein the used buffer identifier value corresponds to the one of the small buffer or the large buffer in which the at least a portion of the network packet was stored.

Example 6 includes the subject matter of any of Examples 1-5, and further including a device driver of the NIC, wherein the device driver is to (i) identify, subsequent to having stored the at least a portion of the network packet in the memory, which of the small buffer or the large buffer has been unused and (ii) reuse the unused one of the small buffer or the large buffer in a subsequently received network packet, and wherein to identify which of the small buffer or the large buffer has been unused comprises to identify based on one or more fields in the descriptor.

Example 7 includes the subject matter of any of Examples 1-6, and wherein the descriptor includes a plurality of buffer pointers, and wherein the plurality of buffer pointers includes at least the first and second buffer pointers.

Example 8 includes the subject matter of any of Examples 1-7, and wherein the small amount of the memory allocated to the small buffer is based on a maximum transmission unit (MTU).

Example 9 includes the subject matter of any of Examples 1-8, and wherein the large amount of the memory allocated to the large buffer is based on a maximum expected size of a jumbo frame.

Example 10 includes one or more machine-readable storage media comprising a plurality of instructions stored thereon that, in response to being executed, cause a network interface controller (NIC) to determine a packet size of a network packet received by the NIC; identify, from a descriptor associated with the network packet and based on the determined packet size of the network packet, a preferred buffer size between (a) a small buffer having a small amount of a memory of the compute device allocated thereto and (b) a large buffer having a larger amount of the memory, relative to the small buffer, allocated thereto; and select, from the descriptor, a buffer pointer based on the preferred buffer size, wherein the buffer pointer comprises one of (a) a small buffer pointer to the small buffer or (b) a large buffer pointer to the large buffer, wherein the small buffer pointer corresponds to a first physical address in the memory corresponding to the small buffer, and wherein the large buffer pointer corresponds to a second physical address in the memory corresponding to the large buffer.

Example 11 includes the subject matter of Example 10, and wherein the plurality of instructions further cause the compute device to store at least a portion of the network packet in the memory based on the selected buffer pointer.

Example 12 includes the subject matter of any of Examples 10 and 11, and wherein the plurality of instructions further cause the compute device to allocate a pool of a plurality of small buffers and a pool of a plurality of large buffers; and configure the descriptor to include the small buffer pointer corresponding to the small buffer from the pool of small buffers and the large buffer pointer corresponding to the large buffer from the pool of large buffers.

Example 13 includes the subject matter of any of Examples 10-12, and wherein the plurality of instructions further cause the compute device to provide, in the descriptor, an indication usable to identify whether the at least a portion of the network packet was stored in the small buffer or the large buffer.

Example 14 includes the subject matter of any of Examples 10-13, and wherein to provide the indication usable to identify whether the at least a portion of the network packet was stored in the small buffer or the large buffer comprises to update a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

Example 15 includes the subject matter of any of Examples 10-14, and wherein to provide the indication usable to identify whether the at least a portion of the network packet was stored in the small buffer or the large buffer comprises to update a used buffer identifier value in the descriptor, wherein the used buffer identifier value corresponds to the one of the small buffer or the large buffer in which the at least a portion of the network packet was stored.

Example 16 includes the subject matter of any of Examples 10-15, and wherein the plurality of instructions further cause the compute device to (i) identify, by a device driver of the NIC and subsequent to having stored the at least a portion of the network packet in the memory, which of the small buffer or the large buffer has been unused and (ii) reuse the unused one of the small buffer or the large buffer in a subsequently received network packet, and wherein to identify which of the small buffer or the large buffer has been unused comprises to identify based on one or more fields in the descriptor.

Example 17 includes a compute device for buffering received network packet data, the compute device comprising circuitry for determining a packet size of a network packet received by a network interface controller (NIC) of the compute device; means for identifying, from a descriptor associated with the network packet and based on the determined packet size, a preferred buffer size between (a) a small buffer having a small amount of a memory of the compute device allocated thereto and (b) a large buffer having a larger amount of the memory, relative to the small buffer, allocated thereto; means for selecting, from the descriptor, a buffer pointer based on the preferred buffer size, wherein the buffer pointer comprises one of (a) a small buffer pointer to the small buffer or (b) a large buffer pointer to the large buffer, wherein the small buffer pointer corresponds to a first physical address in the memory corresponding to the small buffer, and wherein the large buffer pointer corresponds to a second physical address in the memory corresponding to the large buffer; and circuitry for storing at least a portion of the network packet in the memory based on the selected buffer pointer.

Example 18 includes the subject matter of Example 17, and further including circuitry for allocating a pool of a plurality of small buffers and a pool of a plurality of large buffers; and means for configuring the descriptor to include the small buffer pointer corresponding to the small buffer from the pool of small buffers and the large buffer pointer corresponding to the large buffer from the pool of large buffers.

Example 19 includes the subject matter of any of Examples 17 and 18, and further including means for providing, in the descriptor, an indication usable to identify whether the at least a portion of the network packet was stored in the small buffer or the large buffer.

Example 20 includes the subject matter of any of Examples 17-19, and wherein the means for providing the indication usable to identify whether the at least a portion of the network packet was stored in the small buffer or the large buffer comprises means for updating a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

Example 21 includes the subject matter of any of Examples 17-20, and wherein the means for providing the indication usable to identify whether the at least a portion of the network packet was stored in the small buffer or the large buffer comprises means for updating a used buffer identifier value in the descriptor, wherein the used buffer identifier value corresponds to the one of the small buffer or the large buffer in which the at least a portion of the network packet was stored.

Example 22 includes the subject matter of any of Examples 17-21, and further including means for identifying, subsequent to having stored the at least a portion of the network packet in the memory, which of the small buffer or the large buffer has been unused; and means for reusing the unused one of the small buffer or the large buffer in a subsequently received network packet, wherein the means for identifying which of the small buffer or the large buffer has been unused comprises means for identifying based on one or more fields in the descriptor.

Example 23 includes the subject matter of any of Examples 17-22, and wherein the descriptor includes a plurality of buffer pointers, and wherein the plurality of buffer pointers includes at least the first and second buffer pointers.

Example 24 includes the subject matter of any of Examples 17-23, and wherein the small amount of the memory allocated to the small buffer is based on a maximum transmission unit (MTU).

Example 25 includes the subject matter of any of Examples 17-24, and wherein the large amount of the memory allocated to the large buffer is based on a maximum expected size of a jumbo frame.

The invention claimed is:

1. A compute device for buffering received network packet data, the compute device comprising:
   a compute engine;
   a memory; and
   a network interface controller (NIC) to:
   determine a packet size of a network packet received by the NIC;
   identify, from a descriptor associated with the network packet and based on the determined packet size of the network packet, a preferred buffer size between (a) a small buffer having a small amount of the memory allocated thereto and (b) a large buffer having a larger amount of the memory, relative to the small buffer, allocated thereto;
   select, from the descriptor, a buffer pointer based on the preferred buffer size, wherein the descriptor comprises (a) a small buffer pointer to the small buffer and (b) a large buffer pointer to the large buffer, wherein to select the buffer pointer comprises to select the small buffer pointer or the large buffer pointer, and wherein the small buffer pointer corresponds to a first physical address in the memory corresponding to the small buffer and the large buffer pointer corresponds to a second physical address in the memory corresponding to the large buffer; and
   store at least a portion of the network packet in the memory based on the selected buffer pointer.

2. The compute device of claim 1, wherein the NIC is further to:
   allocate a pool of a plurality of small buffers and a pool of a plurality of large buffers; and
   configure the descriptor to include the small buffer pointer corresponding to the small buffer from the pool of small buffers and the large buffer pointer corresponding to the large buffer from the pool of large buffers.

3. The compute device of claim 1, wherein the NIC is further to provide, in the descriptor, an indication usable to identify whether the at least a portion of the network packet was stored in the small buffer or the large buffer.

4. The compute device of claim 3, wherein to provide the indication usable to identify whether the at least a portion of the network packet was stored in the small buffer or the large buffer comprises to update a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

5. The compute device of claim 3, wherein to provide the indication usable to identify whether the at least a portion of the network packet was stored in the small buffer or the large buffer comprises to update a used buffer identifier value in the descriptor, wherein the used buffer identifier value corresponds to the one of the small buffer or the large buffer in which the at least a portion of the network packet was stored.

6. The compute device of claim 1, further comprising a device driver of the NIC, wherein the device driver is to (i) identify, subsequent to having stored the at least a portion of the network packet in the memory, which of the small buffer or the large buffer has been unused and (ii) reuse the unused one of the small buffer or the large buffer in a subsequently received network packet, and wherein to identify which of the small buffer or the large buffer has been unused comprises to identify based on one or more fields in the descriptor.

7. The compute device of claim 1, wherein the descriptor includes a plurality of buffer pointers, and wherein the plurality of buffer pointers includes at least the first and second buffer pointers.

8. The compute device of claim 1, wherein the small amount of the memory allocated to the small buffer is based on a maximum transmission unit (MTU).

9. The compute device of claim 1, wherein the large amount of the memory allocated to the large buffer is based on a maximum expected size of a jumbo frame.

10. One or more non-transitory, machine-readable storage media comprising a plurality of instructions stored thereon that, in response to being executed, cause a network interface controller (NIC) to:
    determine a packet size of a network packet received by the NIC;
    identify, from a descriptor associated with the network packet and based on the determined packet size of the network packet, a preferred buffer size between (a) a small buffer having a small amount of a memory of the compute device allocated thereto and (b) a large buffer having a larger amount of the memory, relative to the small buffer, allocated thereto; and
    select, from the descriptor, a buffer pointer based on the preferred buffer size, wherein the descriptor comprises (a) a small buffer pointer to the small buffer and (b) a large buffer pointer to the large buffer, wherein to select the buffer pointer comprises to select the small buffer pointer or the large buffer pointer, and wherein the small buffer pointer corresponds to a first physical address in the memory corresponding to the small buffer and the large buffer pointer corresponds to a second physical address in the memory corresponding to the large buffer.

11. The one or more non-transitory, machine-readable storage media of claim 10, wherein the plurality of instructions further cause the compute device to store at least a portion of the network packet in the memory based on the selected buffer pointer.

12. The one or more non-transitory, machine-readable storage media of claim 10, wherein the plurality of instructions further cause the compute device to:
allocate a pool of a plurality of small buffers and a pool of a plurality of large buffers; and
configure the descriptor to include the small buffer pointer corresponding to the small buffer from the pool of small buffers and the large buffer pointer corresponding to the large buffer from the pool of large buffers.

13. The one or more non-transitory, machine-readable storage media of claim 10, wherein the plurality of instructions further cause the compute device to provide, in the descriptor, an indication usable to identify whether the at least a portion of the network packet was stored in the small buffer or the large buffer.

14. The one or more non-transitory, machine-readable storage media of claim 13, wherein to provide the indication usable to identify whether the at least a portion of the network packet was stored in the small buffer or the large buffer comprises to update a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

15. The one or more non-transitory, machine-readable storage media of claim 13, wherein to provide the indication usable to identify whether the at least a portion of the network packet was stored in the small buffer or the large buffer comprises to update a used buffer identifier value in the descriptor, wherein the used buffer identifier value corresponds to the one of the small buffer or the large buffer in which the at least a portion of the network packet was stored.

16. The one or more non-transitory, machine-readable storage media of claim 10, wherein the plurality of instructions further cause the compute device to (i) identify, by a device driver of the NIC and subsequent to having stored the at least a portion of the network packet in the memory, which of the small buffer or the large buffer has been unused and (ii) reuse the unused one of the small buffer or the large buffer in a subsequently received network packet, and wherein to identify which of the small buffer or the large buffer has been unused comprises to identify based on one or more fields in the descriptor.

17. A compute device for buffering received network packet data, the compute device comprising:
circuitry for determining a packet size of a network packet received by a network interface controller (NIC) of the compute device;
means for identifying, from a descriptor associated with the network packet and based on the determined packet size, a preferred buffer size between (a) a small buffer having a small amount of a memory of the compute device allocated thereto and (b) a large buffer having a larger amount of the memory, relative to the small buffer, allocated thereto;
means for selecting, from the descriptor, a buffer pointer based on the preferred buffer size, wherein the descriptor comprises (a) a small buffer pointer to the small buffer and (b) a large buffer pointer to the large buffer, wherein to select the buffer pointer comprises to select the small buffer pointer or the large buffer pointer, and wherein the small buffer pointer corresponds to a first physical address in the memory corresponding to the small buffer and the large buffer pointer corresponds to a second physical address in the memory corresponding to the large buffer; and
circuitry for storing at least a portion of the network packet in the memory based on the selected buffer pointer.

18. The compute device of claim 17, further comprising:
circuitry for allocating a pool of a plurality of small buffers and a pool of a plurality of large buffers; and
means for configuring the descriptor to include the small buffer pointer corresponding to the small buffer from the pool of small buffers and the large buffer pointer corresponding to the large buffer from the pool of large buffers.

19. The compute device of claim 17, further comprising means for providing, in the descriptor, an indication usable to identify whether the at least a portion of the network packet was stored in the small buffer or the large buffer.

20. The compute device of claim 19, wherein the means for providing the indication usable to identify whether the at least a portion of the network packet was stored in the small buffer or the large buffer comprises means for updating a buffer length value in a buffer length field in the descriptor, wherein the buffer length field corresponds to the one of the small buffer or the large buffer in which the at least a portion of the network packet was stored, and wherein the buffer length value indicates the amount of data of the network packet stored in the small buffer or the large buffer.

21. The compute device of claim 19, wherein the means for providing the indication usable to identify whether the at least a portion of the network packet was stored in the small buffer or the large buffer comprises means for updating a used buffer identifier value in the descriptor, wherein the used buffer identifier value corresponds to the one of the small buffer or the large buffer in which the at least a portion of the network packet was stored.

22. The compute device of claim 17, further comprising:
means for identifying, subsequent to having stored the at least a portion of the network packet in the memory, which of the small buffer or the large buffer has been unused; and
means for reusing the unused one of the small buffer or the large buffer in a subsequently received network packet,
wherein the means for identifying which of the small buffer or the large buffer has been unused comprises means for identifying based on one or more fields in the descriptor.

23. The compute device of claim 17, wherein the descriptor includes a plurality of buffer pointers, and wherein the plurality of buffer pointers includes at least the first and second buffer pointers.

24. The compute device of claim 17, wherein the small amount of the memory allocated to the small buffer is based on a maximum transmission unit (MTU).

25. The compute device of claim 17, wherein the large amount of the memory allocated to the large buffer is based on a maximum expected size of a jumbo frame.

\* \* \* \* \*